(12) United States Patent
Powers et al.

(10) Patent No.: US 10,494,808 B2
(45) Date of Patent: Dec. 3, 2019

(54) PREFABRICATED PORTABLE STRUCTURE

(71) Applicant: American Douglas Metals, Inc., Orlando, FL (US)

(72) Inventors: Scott Stephen Powers, Longwood, FL (US); Michael Edward Rodriguez, Sunrise, FL (US); Jeffrey Edward Raimonde, Winter Garden, FL (US)

(73) Assignee: American Douglas Metals, Inc., Orlando, FL (US)

( * ) Notice: Subject to any disclaimer, the term of this patent is extended or adjusted under 35 U.S.C. 154(b) by 0 days.

(21) Appl. No.: 16/027,047

(22) Filed: Jul. 3, 2018

(65) Prior Publication Data

US 2019/0010693 A1    Jan. 10, 2019

Related U.S. Application Data

(60) Provisional application No. 62/529,243, filed on Jul. 6, 2017.

(51) Int. Cl.
| | |
|---|---|
| *E04B 1/34* | (2006.01) |
| *E04H 15/44* | (2006.01) |
| *E04H 1/12* | (2006.01) |
| *E04H 15/00* | (2006.01) |
| *E04B 1/343* | (2006.01) |
| *A01M 31/02* | (2006.01) |

(52) U.S. Cl.
CPC ....... *E04B 1/34321* (2013.01); *E04H 1/1205* (2013.01); *E04H 15/001* (2013.01); *E04H 15/44* (2013.01); *A01M 31/025* (2013.01)

(58) Field of Classification Search
CPC ... E04B 1/34321; E04H 15/001; E04H 15/44; E04H 1/1205; A01M 31/025

USPC .......................................................... 52/239
See application file for complete search history.

(56) References Cited

U.S. PATENT DOCUMENTS

| | | | | | |
|---|---|---|---|---|---|
| 1,248,652 | A | * | 12/1917 | Hashberger | E04H 15/44 135/121 |
| 2,841,159 | A | * | 7/1958 | Graham | E04H 15/001 135/95 |
| 3,263,692 | A | * | 8/1966 | Questi | E04H 15/44 135/158 |
| 3,600,870 | A | * | 8/1971 | Greenhalgh | E04B 1/34321 52/745.11 |
| 4,057,941 | A | * | 11/1977 | Schwartz | A01G 9/16 52/63 |

(Continued)

FOREIGN PATENT DOCUMENTS

| | | | | |
|---|---|---|---|---|
| DE | 102015110257 A1 | * | 12/2016 | ........... E04H 1/1205 |
| DE | 202017003291 U1 | * | 7/2017 | ......... E04B 1/34321 |

(Continued)

*Primary Examiner* — Jeanette E Chapman
(74) *Attorney, Agent, or Firm* — Simpson & Simpson, PLLC

(57) ABSTRACT

A portable structure including a base, a first wall panel and a second wall panel. The base includes a first post and a second post. The first wall panel includes a first outer corner extrusion and a second outer corner extrusion, the first outer corner extrusion adapted to partially enclose the first post and the second outer corner extrusion adapted to partially enclose the second post. The second wall panel includes a first inner corner extrusion adapted to fully enclose the first post when used in combination with the first outer corner extrusion.

19 Claims, 14 Drawing Sheets

(56) References Cited

U.S. PATENT DOCUMENTS

| | | | | |
|---|---|---|---|---|
| 4,186,507 A * | 2/1980 | Stinnett | A01M 31/00 | |
| | | | | 43/1 |
| 4,196,555 A * | 4/1980 | Henges, Jr. | E04B 1/34321 | |
| | | | | 52/588.1 |
| 5,070,667 A * | 12/1991 | Schulte | E04B 1/34321 | |
| | | | | 52/241 |
| 5,317,857 A * | 6/1994 | Allison | E04H 1/1205 | |
| | | | | 52/125.6 |
| 5,622,198 A * | 4/1997 | Elsinger | E04B 1/344 | |
| | | | | 135/116 |
| 6,155,747 A * | 12/2000 | Payne | B09B 3/00 | |
| | | | | 405/129.55 |
| 6,178,701 B1 * | 1/2001 | De Paepe | E04B 1/3445 | |
| | | | | 52/36.2 |
| 6,192,643 B1 * | 2/2001 | Zadok | E04B 1/0046 | |
| | | | | 52/204.1 |
| 6,604,328 B1 * | 8/2003 | Paddock | E04B 1/34315 | |
| | | | | 52/264 |
| 7,334,377 B2 * | 2/2008 | Dubensky | E04B 1/3483 | |
| | | | | 52/653.2 |
| 7,509,776 B2 * | 3/2009 | Reisman | E04B 1/34315 | |
| | | | | 403/DIG. 10 |
| 7,814,727 B2 * | 10/2010 | LaCasse | E04B 1/0046 | |
| | | | | 52/222 |
| 8,458,961 B2 * | 6/2013 | Reid | E04H 1/125 | |
| | | | | 52/36.1 |
| 8,646,231 B2 * | 2/2014 | Eyme | E04B 2/7427 | |
| | | | | 52/238.1 |
| 9,080,326 B2 * | 7/2015 | Johnson | B60P 3/341 | |
| 9,624,712 B2 * | 4/2017 | Bottin | E04B 1/3483 | |
| 9,631,365 B2 * | 4/2017 | Bottin | E04B 1/3483 | |
| D812,247 S * | 3/2018 | Price | D25/16 | |
| 10,206,336 B2 * | 2/2019 | Herrick | A01G 9/16 | |
| 2008/0110484 A1 * | 5/2008 | Doran | E04B 1/34315 | |
| | | | | 135/121 |
| 2009/0193735 A1 * | 8/2009 | Kalinowski | E04B 2/60 | |
| | | | | 52/281 |
| 2009/0223161 A1 * | 9/2009 | Segall | E04B 1/34315 | |
| | | | | 52/588.1 |
| 2009/0313925 A1 * | 12/2009 | Lyons | E04B 1/34315 | |
| | | | | 52/274 |
| 2012/0006369 A1 * | 1/2012 | Cantin | E04B 1/34305 | |
| | | | | 135/96 |
| 2012/0242103 A1 * | 9/2012 | Sidi | B60P 3/34 | |
| | | | | 296/26.02 |
| 2012/0255241 A1 * | 10/2012 | Nishikawa | E04B 1/34315 | |
| | | | | 52/105 |
| 2013/0091796 A1 * | 4/2013 | Thomas | E04H 1/1205 | |
| | | | | 52/506.01 |
| 2013/0232886 A1 * | 9/2013 | Yoder | E04B 1/34315 | |
| | | | | 52/79.1 |
| 2014/0123572 A1 * | 5/2014 | Segall | G09B 9/003 | |
| | | | | 52/79.5 |
| 2015/0033639 A1 * | 2/2015 | Wilson | E04H 9/04 | |
| | | | | 52/79.5 |
| 2017/0089061 A1 * | 3/2017 | Rothenberg | E04H 1/1205 | |
| 2018/0105476 A1 * | 4/2018 | Wallis | C05F 9/02 | |
| 2018/0291614 A1 * | 10/2018 | Evert | E04H 9/06 | |

FOREIGN PATENT DOCUMENTS

| | | | | | |
|---|---|---|---|---|---|
| EP | | 3418460 A1 * | 12/2018 | | E04B 1/34326 |
| GB | | 1173468 A  * | 12/1969 | | E04B 1/34326 |
| WO | WO-9106725 A1 * | | 5/1991 | | E04B 1/34321 |
| WO | WO-2007129320 A2 * | | 11/2007 | | E04B 1/34315 |
| WO | WO-2009068831 A2 * | | 6/2009 | | E04B 1/34321 |
| WO | WO-2011058526 A2 * | | 5/2011 | | E04B 1/0007 |
| WO | WO-2015168747 A1 * | | 11/2015 | | E04B 1/3444 |
| WO | WO-2017100854 A1 * | | 6/2017 | | E04B 2/7453 |

* cited by examiner

PREFABRICATED PORTABLE STRUCTURE

CROSS-REFERENCE TO RELATED APPLICATIONS

This patent application claims the benefit under 35 U.S.C. § 119(e) of U.S. Provisional Patent Application No. 62/529,243, filed Jul. 6, 2017, which application is incorporated herein by reference.

FIELD OF THE INVENTION

The invention broadly relates to portable structures, more specifically to portable structures adapted to be assembled at a point of use, and even more particularly to a prefabricated portable structure adapted to be assembled at a point of use and adapted for a variety of uses, e.g., a hunting blind.

BACKGROUND OF THE INVENTION

Hunting blinds, and structures similar thereto, are used to conceal and protect hunters. Such blinds are used to reduce the chance of an animal detecting the presence of a hunter, thereby increasing the probability a hunter will be successful. Various types of blinds have been developed to accommodate different animals and different environments. For example, blinds used when hunting deer may include features that are not necessary when hunting ducks, e.g., an elevated platform. Moreover, blinds used in marshes or fields may include features that are not necessary for blinds used in a forest, e.g., a sealed waterproof base platform.

Other benefits are also provided by various hunting blinds in addition to concealing a hunter from animals. For example, hunting blinds may provide protection from environmental conditions such as sunlight, rain, wind, snow and low temperatures. Thus, hunting blinds are used to prolong the length of time a hunter may remain at a particular location, without compromising the hunter's chance of success.

A variety of materials are used to construct hunting blinds. Rigid materials such as plywood, molded plastic, etc., are used, as well as flexible materials such as nylon, woven PTFE, polyester, etc. Some hunting blinds are carriable in a pack and readily assembled, e.g., blinds that have similar structural arrangements as a camping tent. These types of blinds typically include rigid and/or semi-rigid frame elements, e.g., aluminum or carbon fiber poles, enclosed with a flexible fabric material. Alternatively, some hunting blinds are constructed at a desired location and are considered permanent or semi-permanent structures. These types of blinds may be constructed as small shed like structures, or formed from molded plastic components and resemble portable outhouse structures.

As can be derived from the variety of devices and methods directed at providing secure and concealed shelter, many means have been contemplated to accomplish the desired end, i.e., concealing a hunter from animals while providing a comfortable location for the hunter to remain for extended periods of time. Heretofore, tradeoffs between portability, concealment and comfort were required.

BRIEF SUMMARY OF THE INVENTION

The present invention broadly comprises a prefabricated portable structure that can be transported to a desired location and rapidly assembled prior to use. The structure may come in a variety of sizes and shapes, and can be used for such activities as hunting, camping, and sheltering from catastrophic events, e.g., post-hurricane sheltering.

Broadly, some embodiments of a present invention comprise a portable structure. The portable structure includes a base, a first wall panel and a second wall panel. The base includes a first post and a second post. The first wall panel includes a first outer corner extrusion and a second outer corner extrusion, the first outer corner extrusion adapted to partially enclose the first post and the second outer corner extrusion adapted to partially enclose the second post. The second wall panel includes a first inner corner extrusion adapted to fully enclose the first post when used in combination with the first outer corner extrusion.

Broadly, some embodiments of a present invention comprise a two-piece extrusion assembly for securing a first wall panel and a second wall panel to a base comprising a post. The two-piece extrusion assembly includes an outer corner extrusion and an inner corner extrusion. The outer corner extrusion includes a first wall panel mount and a first post mount adapted to partially enclose the post. The inner corner extrusion includes a second wall panel mount and a second post mount adapted to fully enclose the post when used in combination with the outer corner extrusion.

Broadly, some embodiments of a present invention comprise a method of assembling a portable shelter. The portable structure includes a base having a first post and a second post, a first wall panel having a first outer corner extrusion and a second outer corner extrusion, the first outer corner extrusion adapted to partially enclose the first post and the second outer corner extrusion adapted to partially enclose the second post, and a second wall panel having a first inner corner extrusion adapted to fully enclose the first post when used in combination with the first outer corner extrusion. The method includes: positioning the first outer corner extrusion about the first post and the second outer corner extrusion about the second post; positioning the first inner corner extrusion adjacent to the first outer corner extrusion; securing the first inner corner extrusion to the first outer corner extrusion; and, securing the first inner corner extrusion to the first post via a first fastener.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodologies, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Although any methods, devices or materials similar or equivalent to those described herein can be used in the practice or testing of the invention, the preferred methods, devices, and materials are now described.

Figure 1:
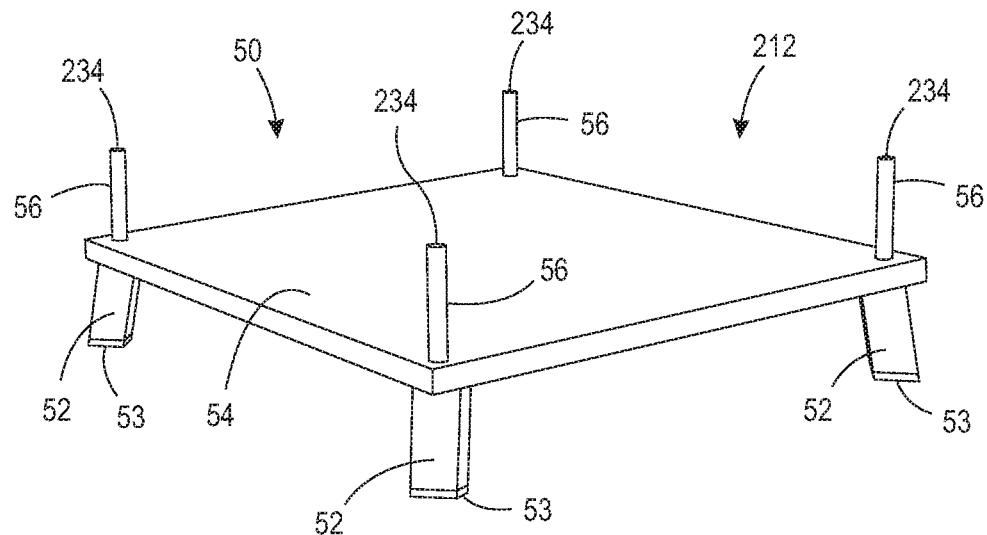
FIG. 1 is a perspective view of an embodiment of a base portion for a present prefabricated portable structure.

Adverting now to the figures, FIG. 1 shows base 50 comprising legs 52, feet 53, base plate 54 and posts 56. Base 50 supports the fully assembled prefabricated portable structure described herein. It should be appreciated that some embodiments may not include feet 53.

Figure 2:
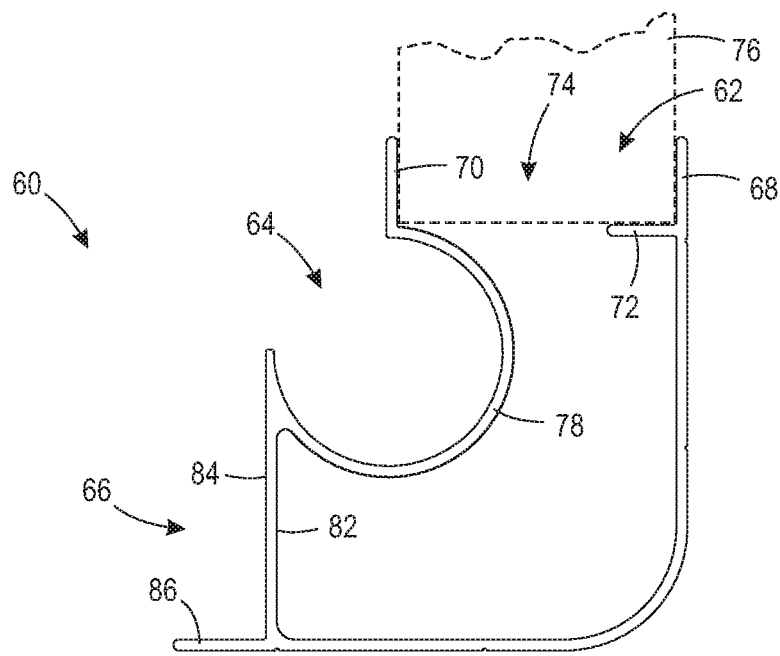
FIG. 2 is a cross sectional view of an embodiment of an outer corner for a present prefabricated portable structure.

FIG. 2 is a cross sectional view of an embodiment of an outer corner for a present prefabricated portable structure, i.e., outer corner 60. Outer corner 60 comprises panel mount 62, post mount 64 and inner corner mount 66. Panel mount 62 comprises side walls 68 and 70 and flange 72. Opening 74 is formed by side walls 68 and 70 and flange 72 and provides a mounting location for panel 76. Post mount 64 comprises circular sector 78, flange 70 extending therefrom as well as alignment surface 82. Circular sector 78 is arranged to fit about a portion of each of posts 56 on base 50. Inner corner mount 66 comprises mating wall 84 and flange 86. Outer corner 60 is preferably formed via extrusion, e.g., extruded aluminum; however, any means known in the art that can produce the necessary features may be used to form corner 60. Moreover, the exposed outer surface of corner 60 is depicted as generally smooth, although other configurations are also possible, e.g., rigged, and such variations fall within the scope of the claims. The interaction of post mount 64 and inner corner mount 66 with inner corner 90 is discussed in greater detail infra.

Figure 3:
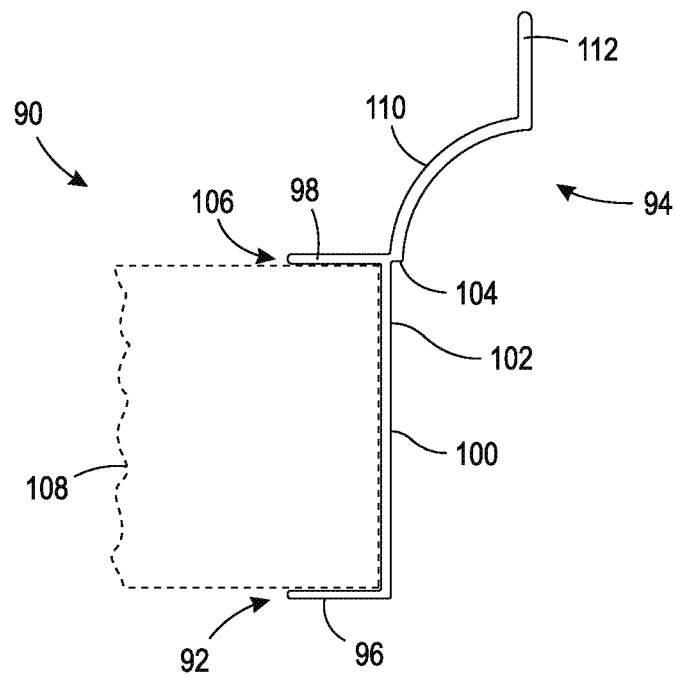
FIG. 3 is a cross sectional view of an embodiment of an inner corner for a present prefabricated portable structure.

FIG. 3 is a cross sectional view of an embodiment of an inner corner for a present prefabricated portable structure, i.e., inner corner 90. Inner corner 90 comprises panel mount 92 and post mount 94. Panel mount 92 comprises side walls 96 and 98, mating wall 100 connected therebetween, alignment surface 102 and alignment stop 104. Opening 106 is formed by side walls 96 and 98 and mating wall 100 and provides a mounting location for panel 108. Post mount 94 comprises circular sector 110 and flange 112. Circular sector 110 is arranged to fit about a portion of each of posts 56 on base 50, and fully encloses each of posts 56 when used in combination with circular sector 78. However, it should be appreciated that the combination of circular sectors 78 and 110 may collectively form less than a full circle, provided the combination of sectors is sufficient to secure the various panels to base 50. Inner corner 90 is preferably formed via extrusion, e.g., extruded aluminum; however, any means known in the art that can produce the necessary features may be used to form corner 90. Moreover, the exposed outer surface of corner 90 is depicted as generally smooth, although other configurations are also possible, e.g., rigged, and such variations fall within the scope of the claims.

Figure 4:
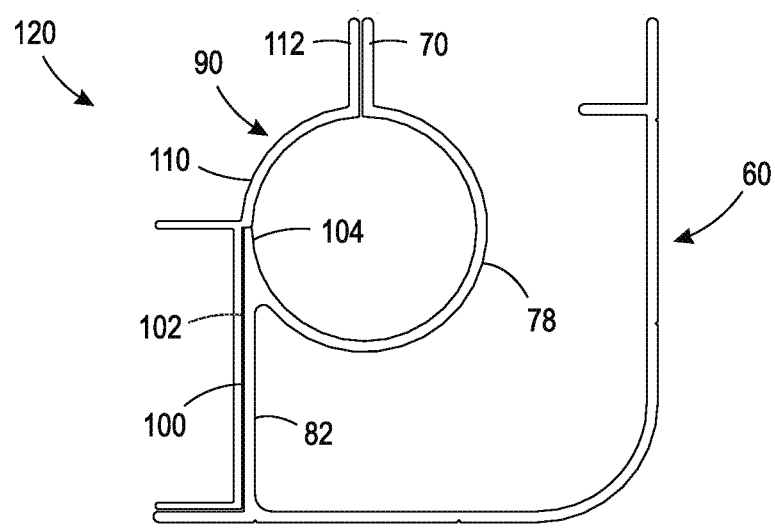
FIG. 4 is a cross sectional view of an embodiment of inner and outer corners for a present prefabricated portable structure in an assembled arrangement.

FIG. 4 is a cross sectional view of an embodiment of inner and outer corners 90 and 60, respectively, for a present prefabricated portable structure in an assembled arrangement, i.e., assembled corner 120. When formed into assembled corner 120, side wall 70 of outer corner 60 and flange 112 of inner corner 90 positioned adjacent and/or in contact with each other. Alignment surface 102 is arranged along mating wall 100 and configured to receive mating wall 84 with alignment stop 104 positioned to orient circular sector 78 relative to circular sector 110. The method of positioning inner corner 90 relative to outer corner 60 is described in greater detail infra.

Figure 5:
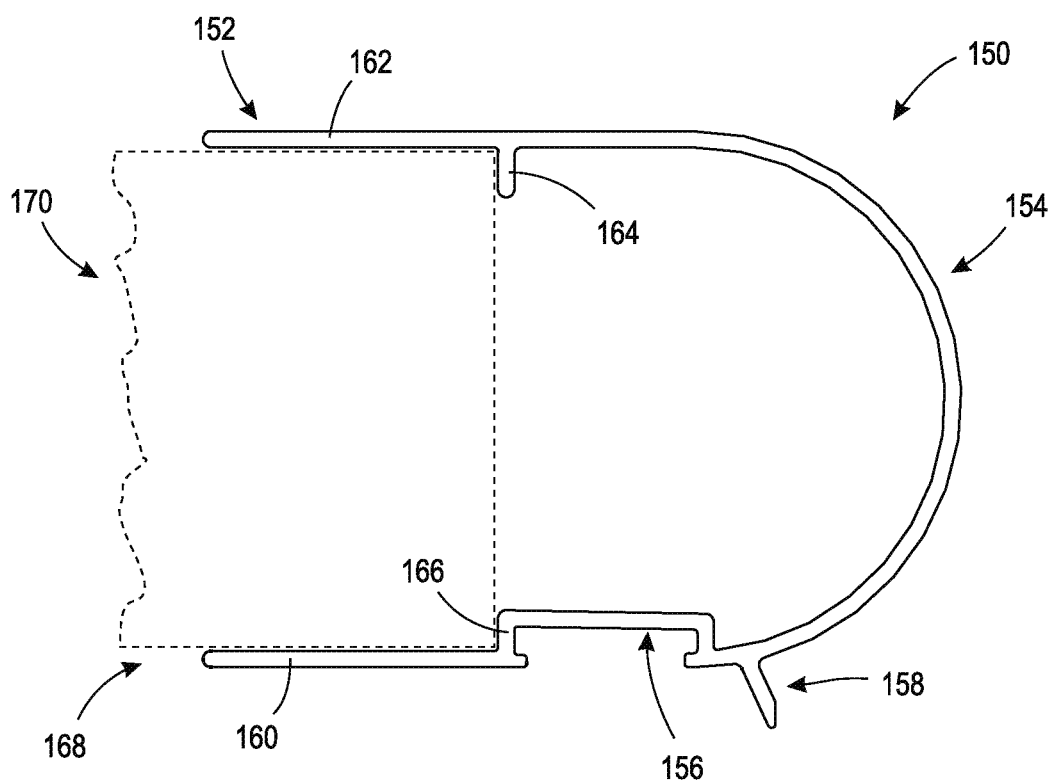
FIG. 5 is a cross sectional view of an embodiment of a roof surround for a present prefabricated portable structure.

FIG. 5 is a cross sectional view of an embodiment of a roof surround for a present prefabricated portable structure, i.e., roof surround 150. It should be appreciated that four segments of roof surround 150 are combined with mitered corners therebetween to form a complete roof surround. However, if a roof panel is formed that has greater than or less than four edges, more than or fewer than four roof surround segments will be necessary. Roof surround 150 comprises panel mount 152, bullnose portion 154, locking channel 156 and drip edge 158. Panel mount 152 comprises side walls 160 and 162, flange 164 and stop 166. Opening 168 is formed by side walls 160 and 162, flange 164 and stop 166 and provides a mounting location for roof panel 170. Bullnose portion 154 provides a convenient means of permitting rain and snow to leave the roof area. Drip edge 158 minimizes falling rain and snow from reaching the sides of the present prefabricated portable structure. Roof surround 150 is preferably formed via extrusion, e.g., extruded aluminum; however, any means known in the art that can produce the necessary features may be used to form surround 150. Moreover, the exposed outer surface of surround 150 is depicted as generally smooth, although other configurations are also possible, e.g., rigged, and such variations fall within the scope of the claims. Locking channel 156 is arranged to receive L-shaped brackets 172 therein to fixedly secure adjacent segments of roof surround 150. However, if roof panel 170 is not rectangular or square in shape, brackets 172 will be a shape matched to the shape of the corner angles formed, e.g., a triangular roof panel may require V-shaped brackets. Moreover, channel 156 may be used to secure any other desired accessory to surround 150, e.g., lights, shades, etc.

It should be appreciated, that although embodiments of outer corner 60, inner corner 90 and roof surround 150 are described above as being formed from extruded aluminum, it is also possible to form corners 60 and 90 and surround 150 from other materials, e.g., resins. In short, a variety of extrudable materials may be used to form corners 60 and 90 and surround 150, provided the materials are sufficient to properly secure the wall panels to the base posts.

Panels 76 and 108 and roof panel 170 may be constructed in a variety of forms. For example, the foregoing panels may be structural aluminum panels comprising opposed 0.020" thick aluminum sheets having about 2" of polystyrene disposed therebetween. The polystyrene provides structural integrity and strength, as well as insulation from environmental conditions, e.g., heat in summer and cold in winter. It should be appreciated that the aluminum sheets may be formed from other materials, e.g., molded resin-based panels, and the filler material may be formed from other materials, e.g., expandable foam, and/or may be formed in a variety of arrangements, e.g., a honeycomb arrangement versus a full solid form. Such variations fall within the scope of the claims herebelow. Moreover, the various panels may be secured within the corners and roof surround by any means known in the art, e.g., adhesives, fasteners, welding, etc.

FIGS. 6 through 20 depict an embodiment of the assembly of an embodiment of a present prefabricated portable structure, i.e., structure 200. The following is best understood in view of FIGS. 6 through 20, with some reference to FIGS. 1 through 5.

Structure 200 may be shipped to or otherwise transported to an assembly location broken down into its component elements, i.e., first, second, third and fourth side panels 202, 204, 206 and 208, respectively, roof panel 210 and base 212. It should be appreciated that although the presently described embodiments include four side panels and a generally square roof panel, other configurations are also possible, e.g., an octagon arrangement. Moreover, the various panels may include windows, doors, or other known means of ingress, egress or viewing. For example, structure 200 may include more than one doorway.

First side panel 202 comprises panel 214 having door 216 arranged therein, and oppositely disposed inner corners 90 each having latch 220 at its upper portion. Roof panel 210 comprises four segments of roof surround 150 and reinforcement plate 222 arranged adjacent to the perimeter on lower surface 224. Reinforcement plate 222 may be affixed to lower surface 224 by any means known in the art, e.g., adhesive or fasteners. Reinforcement plate 222 comprises keeper 226 arranged for engagement by latch 220. An example of a suitable latch and keeper combination is a Southco Soft-Latch™ Flexible Cover C7 Draw Latch from Southco of Concordville, Pa.

Second side panel 204 comprises panel 228 having window 230 arranged therein, and oppositely disposed inner corners 90 each having latch 220 at its upper portion. Third and fourth side panels 206 and 208 each comprises panel 232 having window 230 arranged therein, and oppositely disposed outer corners 60. The assembly of structure 200 is now described herebelow.

Base 212 is positioned at the desired assembly location for structure 200. Third side panel 206 is slidingly engaged with posts 234 of base 212 via circular sectors 78 of outer corners 60. After placement over posts 234, side panel 206 is self-supported via the interaction between posts 234 and corners 60, however it is possible that in some embodiments addition support may be needed, e.g., when circular sectors 78 are less than or equal to semi-circular portions. Next fourth side panel 208 is slidingly engaged with posts 234 of base 212 via circular sectors 78 of outer corners 60. After placement over posts 234, side panel 208 is self-supported via the interaction between posts 234 and corners 60, however it is possible that in some embodiments addition support may be needed, e.g., when circular sectors 78 are less than or equal to semi-circular portions. Moreover, it is possible that after the placement of side panel 206, side panel 204 may be arranged and secure relative to side panel 206, as described herebelow. In such an arrangement, structure 200 would include two walls.

Subsequently, second side panel 204 is inserted between third and fourth side panels 206 and 208, respectively, within the area defined by base 212. The foregoing method of alignment may be started at either side of side panel 204. The terminal end of alignment surface 82 is abutted against alignment stop 104 on first side 236, and side panel 204 is then rotated to abut the terminal end of alignment surface 82 against alignment stop 104 on second side 238. After rotation and abutment, fasteners 240 are installed through flange 112 and flange 70, thereby securing inner corner 90 to outer corner 60. It should be appreciated that fasteners 240 may pass into the panel elements; however, such contact is not necessary. Then, fasteners 242 are installed through circular sector 110 and posts 234 thereby securing the assembly to base 212. Fasteners 240 and 242 may be any suitable fastener, e.g., self-drilling screws, bolts, etc. Next roof panel 210 may be partially positioned over the assembly of second, third and fourth side panels 204, 206 and 208, respectively. It should be appreciated that roof panel 210 may be positioned over the complete assembly of first, second, third and fourth side panels 202, 204, 206 and 208, respectively; however, its positioning is more convenient when one panel is not present. Moreover, in instances when only two side panels are secured to the base, roof panel 210 may also be positioned on the top surfaces of those two panels. Next, the process of installing second side panel 204 is repeated for first side panel 202.

Figure 6:
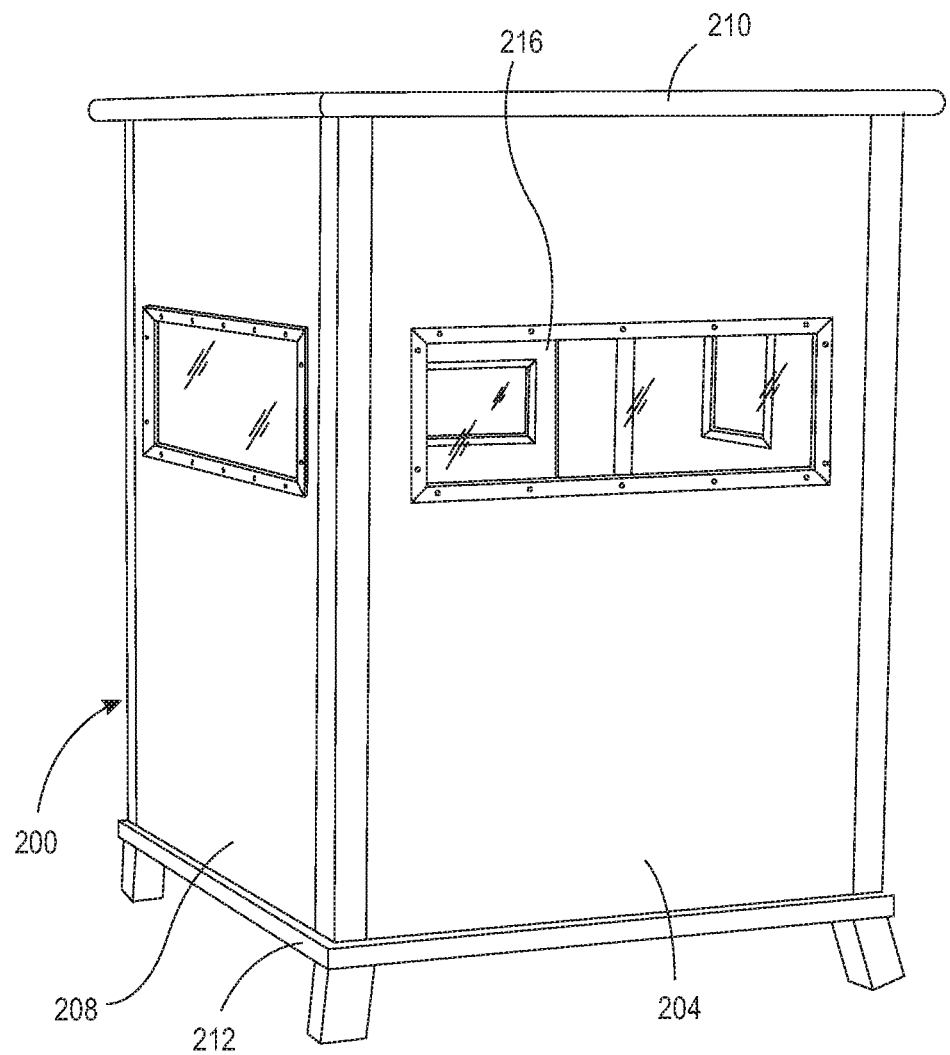
FIG. 6 is a perspective view of an embodiment of a present invention prefabricated portable structure.
Figure 7:
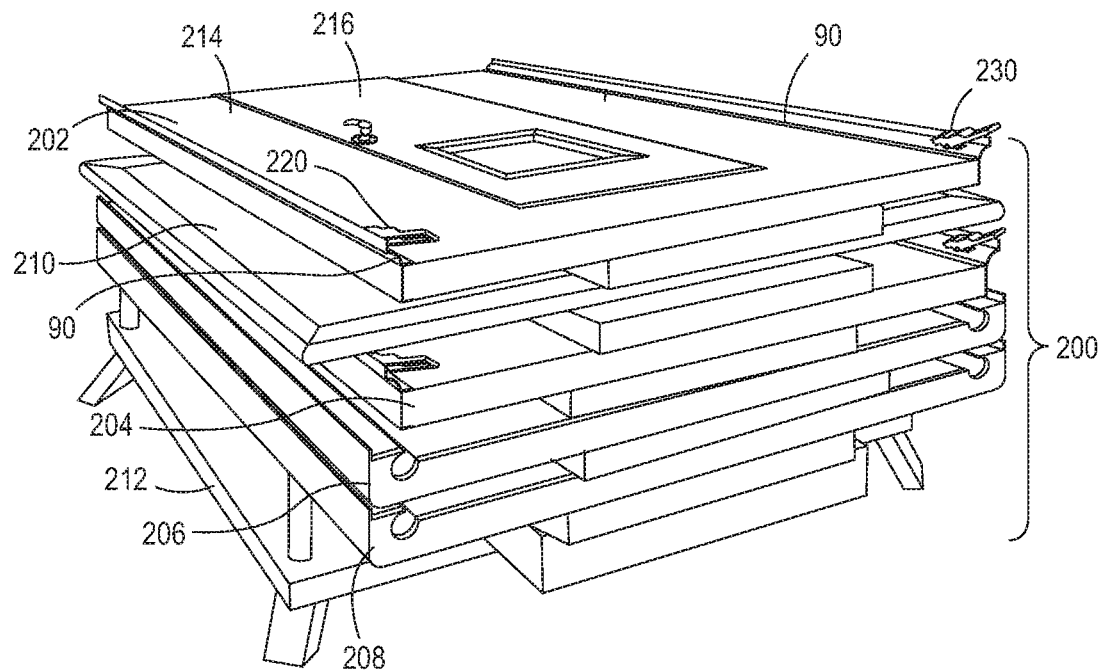
FIG. 7 is a perspective view of an embodiment of a present invention prefabricated portable structure in an unassembled arrangement.
Figure 8:
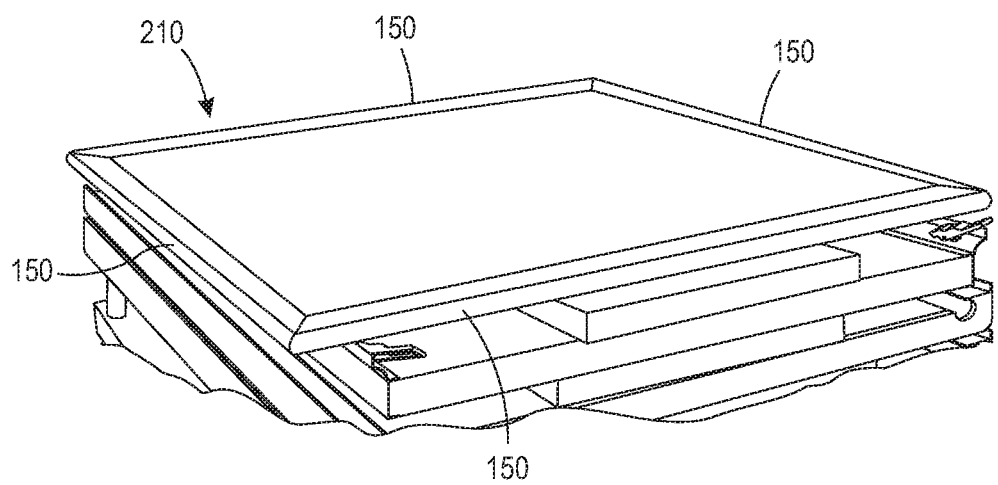
FIG. 8 is a perspective view of a roof portion for a present invention prefabricated portable structure.
Figure 9:
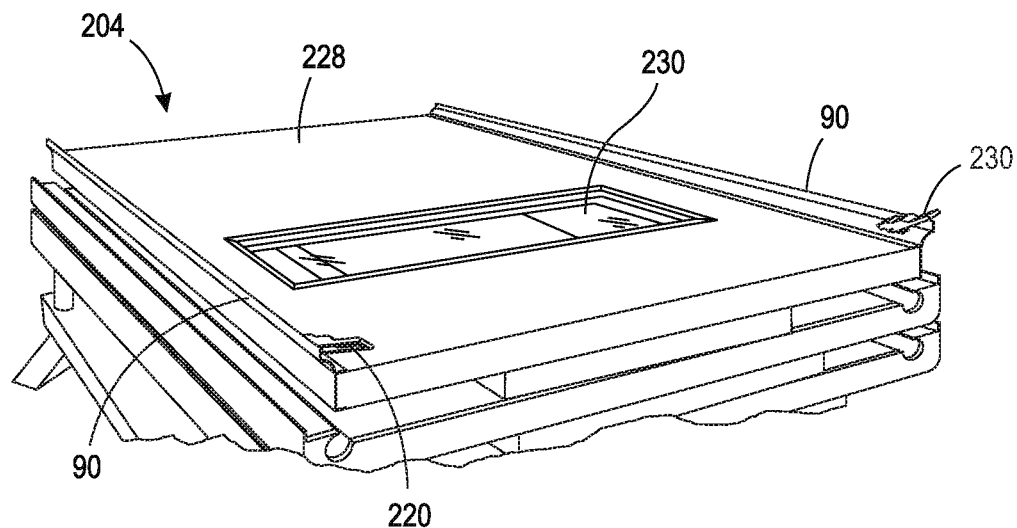
FIG. 9 is a perspective view of an embodiment of a panel including inner corners and a window for a present invention prefabricated portable structure.
Figure 10:
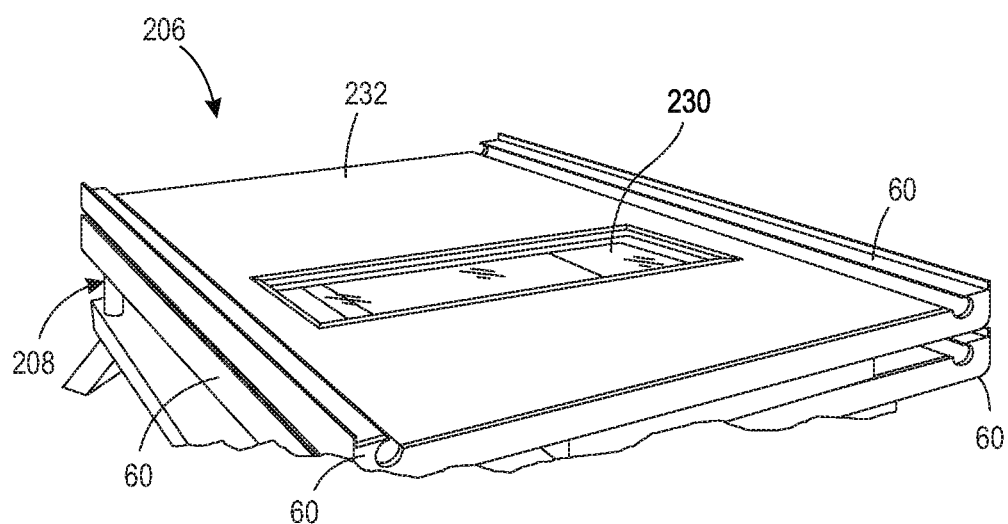
FIG. 10 is a perspective view of an embodiment of another panel including an outer corner and a window for a present invention prefabricated portable structure.
Figure 11:
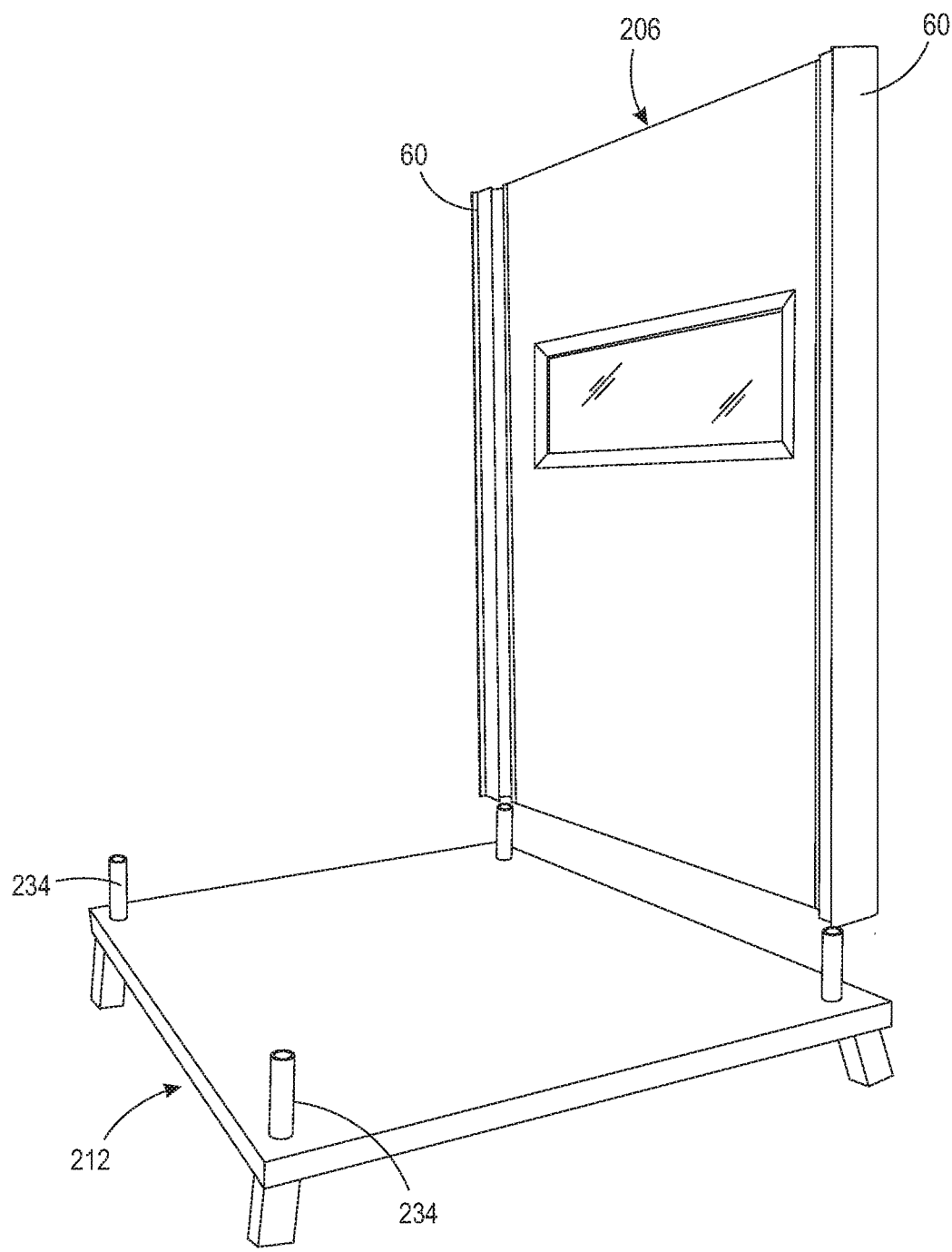
FIG. 11 is a perspective view of an embodiment of a base portion for a present prefabricated portable structure having an embodiment of a panel being installed thereon.
Figure 12:
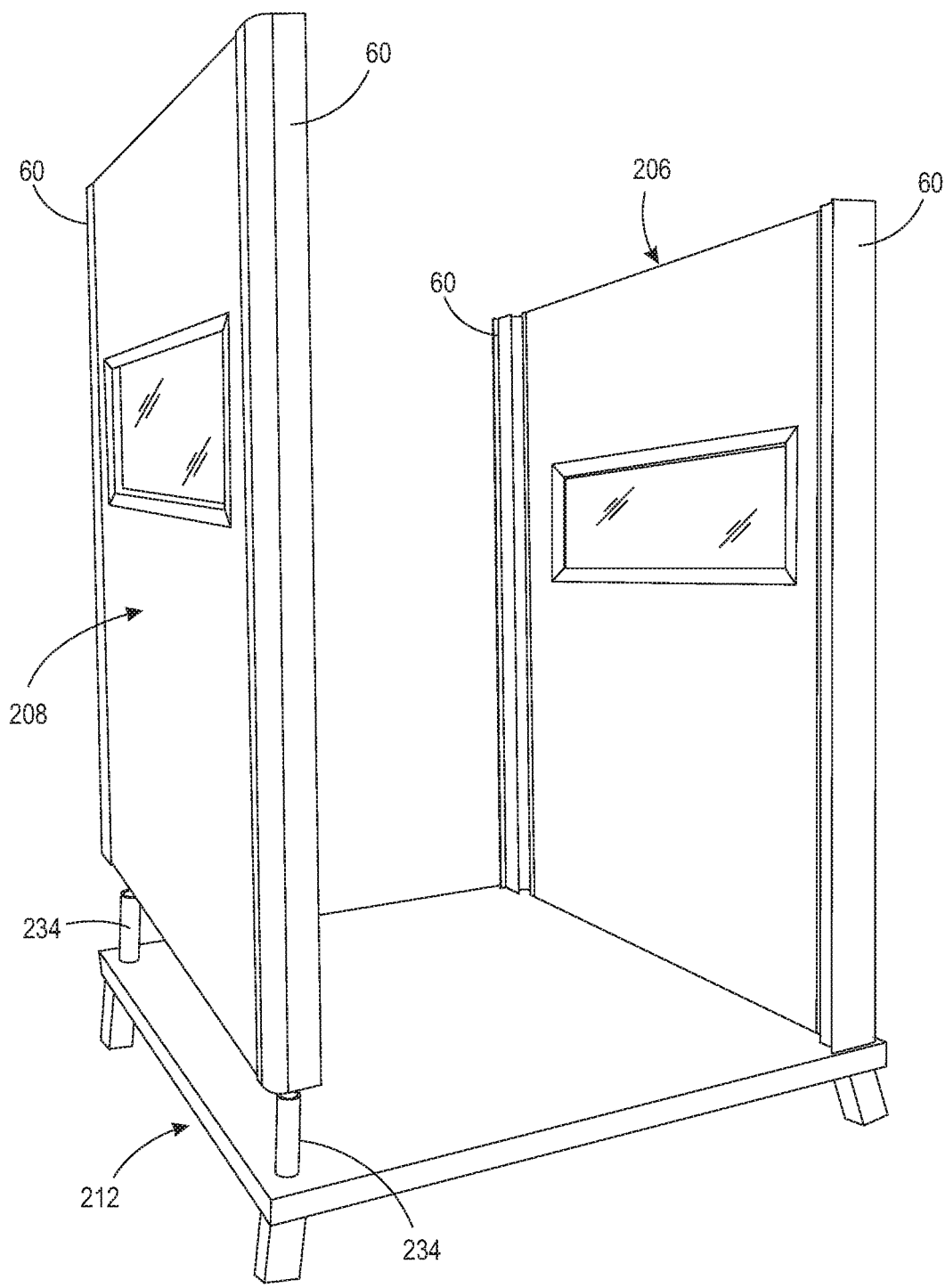
FIG. 12 is a perspective view of an embodiment of a base portion for a present prefabricated portable structure having an embodiment of a panel installed thereon.
Figure 13:
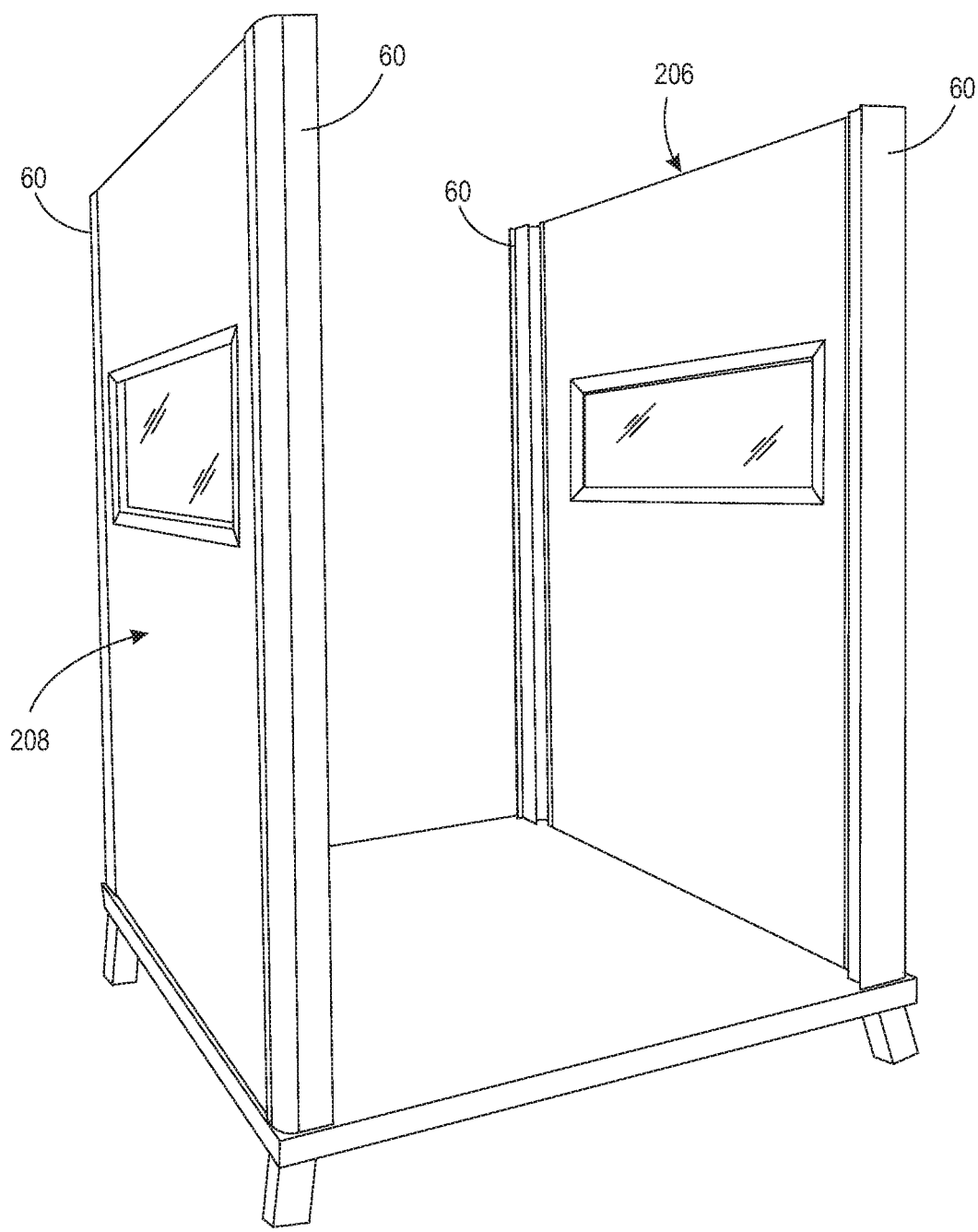
FIG. 13 is a perspective view of an embodiment of a base portion for a present prefabricated portable structure having embodiments of two panel being installed thereon.
Figure 14:
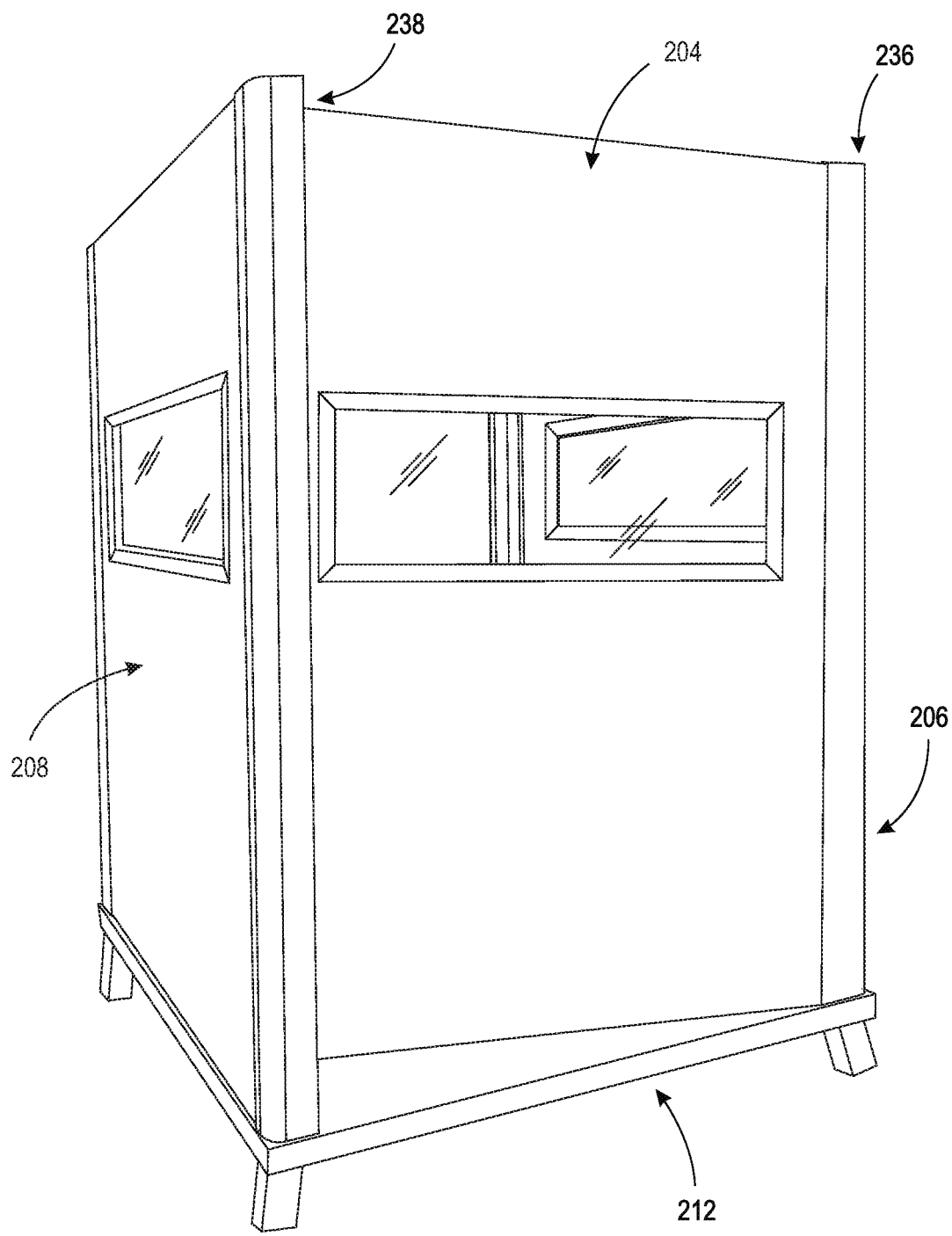
FIG. 14 is a perspective view of an embodiment of a base portion for a present prefabricated portable structure having an embodiment of a panel, having inner corners, being installed thereon.
Figure 15:
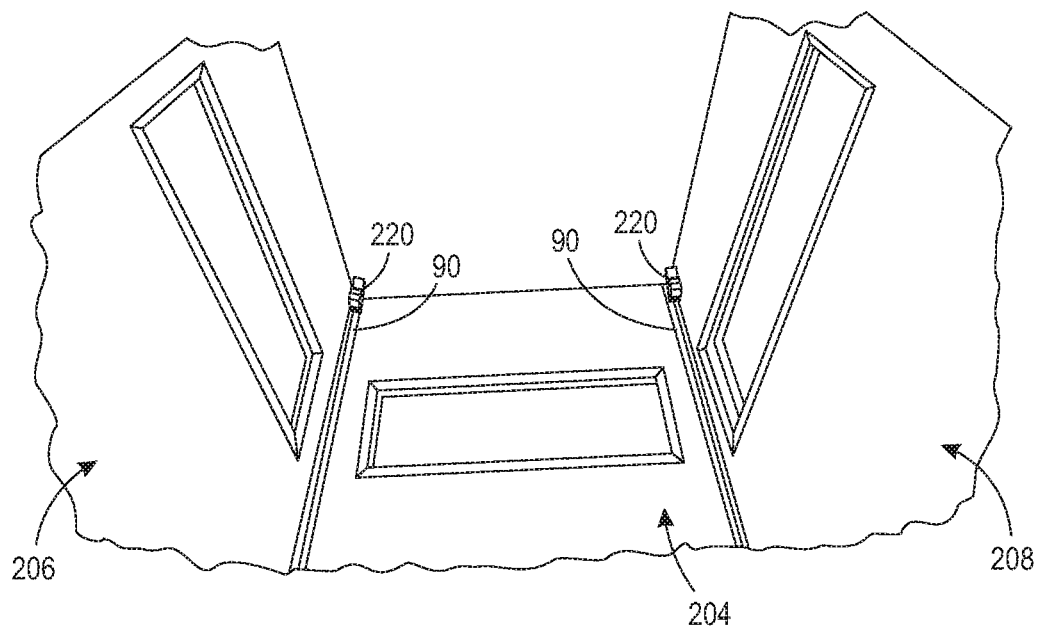
FIG. 15 is a perspective view of an embodiment of an interior portion of a present prefabricated portable structure.
Figure 16:
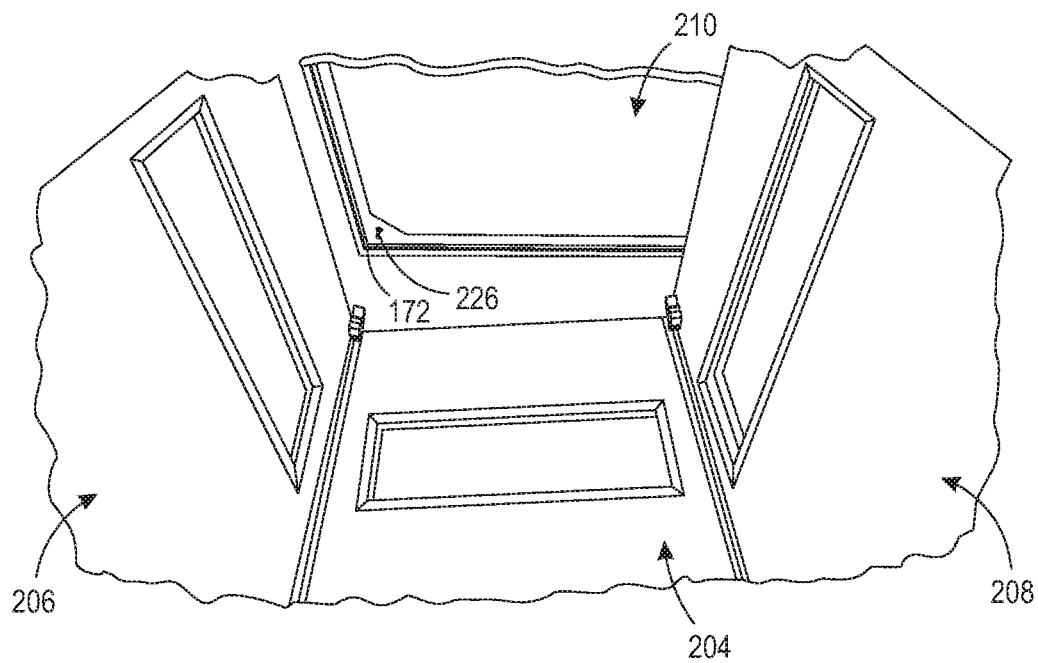
FIG. 16 is a perspective view of an embodiment of an interior portion of a present prefabricated portable structure having an embodiment of a roof portion being positioned thereon.
Figure 17:
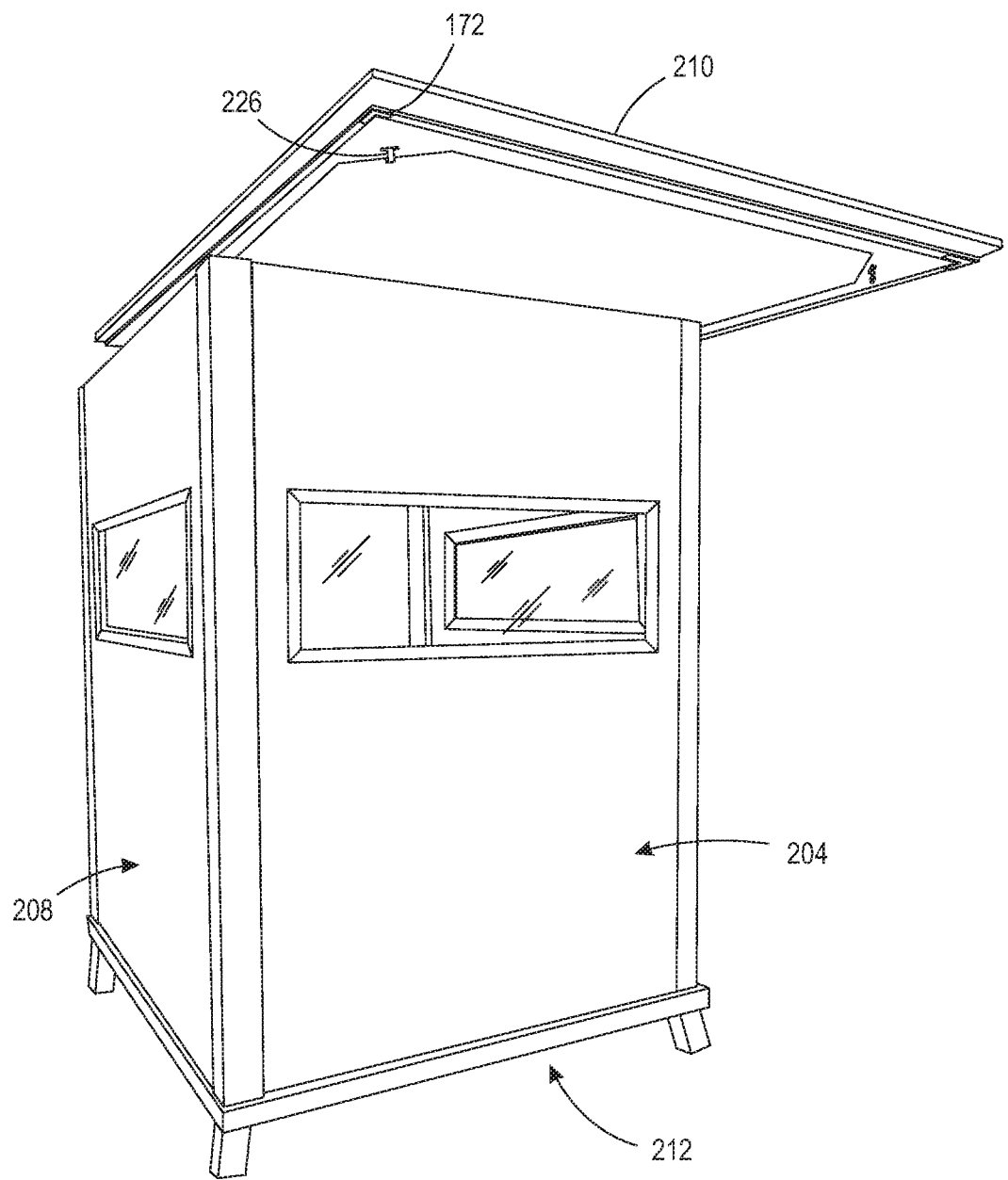
FIG. 17 is a perspective view of an embodiment of a present prefabricated portable structure having an embodiment of a roof portion positioned partially thereon.
Figure 18:
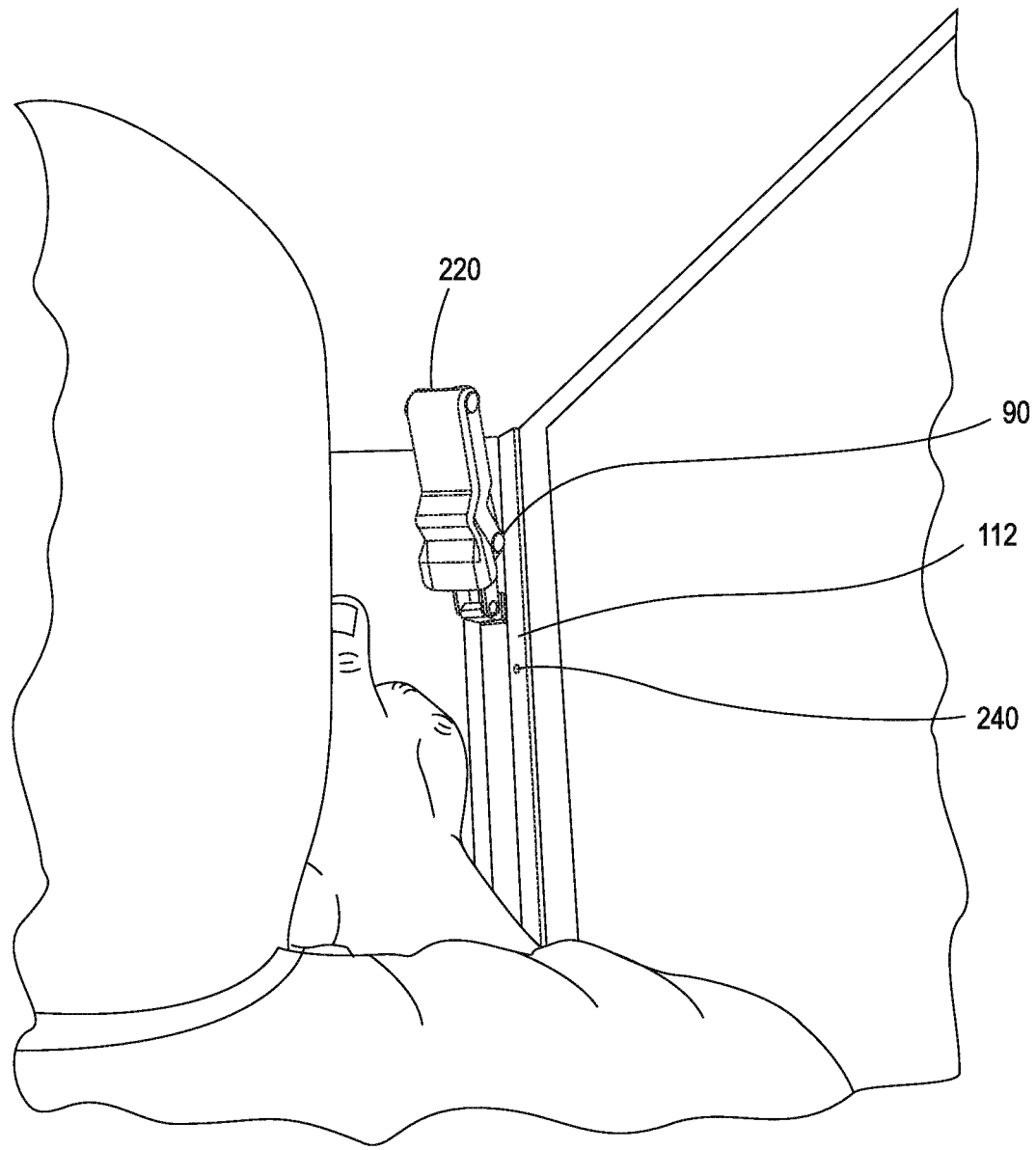
FIG. 18 is a perspective view of an embodiment of a roof buckle in a lower position.
Figure 19:
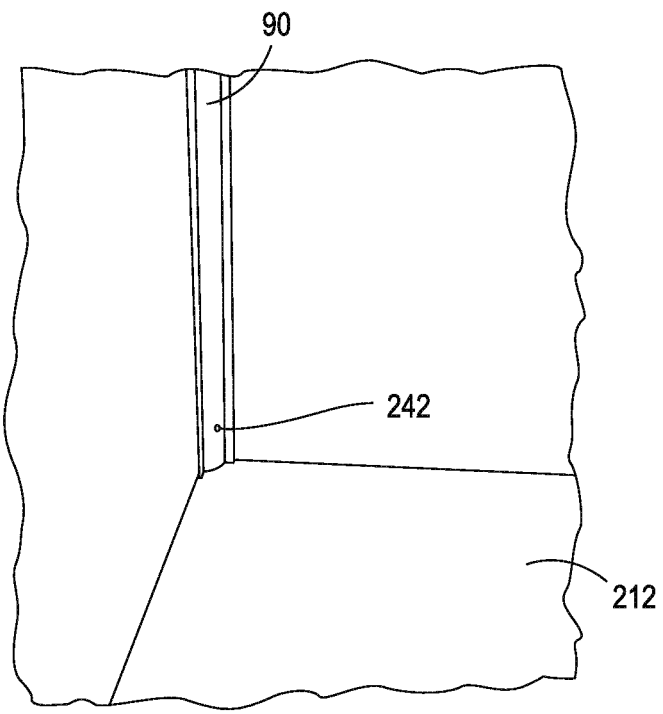
FIG. 19 is a perspective view of an embodiment of an inner corner showing a hole arranged to receive a fastener to secure the inner corner to a post extending from an embodiment of a base portion and showing an installed fastener therein; and, FIG. 20 is a perspective view of an embodiment of an interior portion of a present prefabricated portable structure having an embodiment of a roof portion being positioned thereon.
Figure 20:
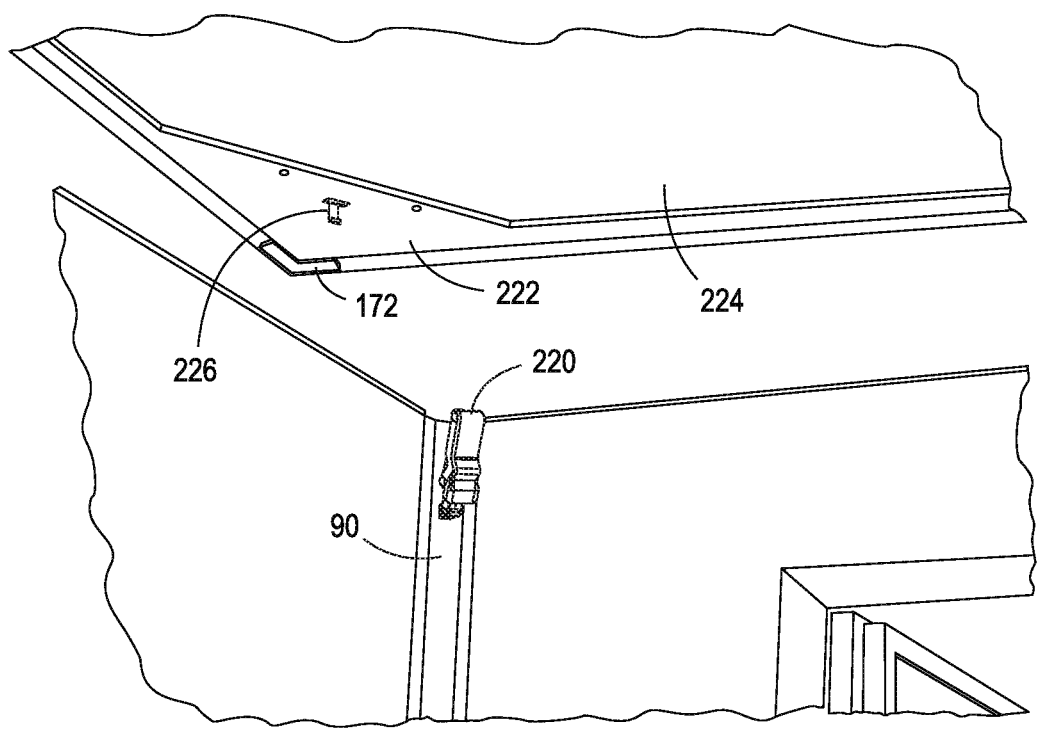

After all side panels 202, 204, 206 and 208 are secured, roof panel 210 is positioned over the assembly such that keepers 226 are aligned for engagement by latches 220. After alignment of roof panel 210, latches 220 are engaged with keepers 226 thereby positively securing roof panel 210 to the assembly of side panels 202, 204, 206 and 208. As depicted in FIGS. 6 and 20, the fully assembled structure, i.e., structure 200, provides a shelter suitable for a variety of uses.

It should be appreciated that various mating surfaces may include sealing means to prevent ingress of water and to maximize the insulation characteristics of the structure. For example, the sealing means may be included between the lower surface of each panel and the base, between the upper surface of each panel and the roof, between mating surfaces of the inner and outer corners, and/or around windows and doors.

It should be further appreciated that the presently described prefabricated portable structure provides a rapidly assembled portable structure, capable of affording its occupants shelter from external environmental conditions and concealment from others, including in some instances animals. The portable structures are not limited to hunting blinds and may also be used for portable camping or emergency use structures. For example, after catastrophic weather events such as a hurricane, the presently disclosed structures may be constructed to provide temporary shelter during cleanup and rebuilding efforts.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A portable structure comprising:
    a base comprising a first post and a second post;
    a first wall panel comprising a first outer corner extrusion and a second outer corner extrusion, the first outer corner extrusion adapted to partially enclose the first post and the second outer corner extrusion adapted to partially enclose the second post; and,
    a second wall panel comprising a first inner corner extrusion adapted to fully enclose the first post when used in combination with the first outer corner extrusion.

2. The portable structure of claim 1 wherein the base further comprises a third post and a fourth post and the second wall panel further comprises a second inner corner extrusion, the portable structure further comprising:
    a third wall panel comprising a third outer corner extrusion and a fourth outer corner extrusion, the third outer corner extrusion adapted to partially enclose the third post and the fourth outer corner extrusion adapted to partially enclose the fourth post; and,
    a fourth wall panel comprising a third inner corner extrusion and a fourth inner corner extrusion, the third inner corner extrusion adapted to fully enclose the second post when used in combination with the second outer corner extrusion and the fourth inner corner extrusion adapted to fully enclose the fourth post when used in combination with the fourth outer corner extrusion,
    wherein the second inner corner extrusion is adapted to fully enclose the third post when used in combination with the third outer corner extrusion.

3. The portable structure of claim 2 wherein the first inner corner extrusion further comprises a first latch, the second inner corner extrusion further comprises a second latch, the third inner corner extrusion further comprises a third latch, and the fourth inner corner extrusion further comprises a fourth latch, the portable structure further comprising:
    a roof panel adapted to be secured to the first wall panel, the second wall panel, the third wall panel, and the fourth wall panel using the first latch, the second latch, the third latch and the fourth latch.

4. The portable structure of claim 2 wherein at least one of the first wall panel, the second wall panel, the third wall panel, and the fourth wall panel comprises a door, and/or at least one of the first wall panel, the second wall panel, the third wall panel, and the fourth wall panel comprises a window.

5. The portable structure of claim 2 further comprising:
    a first fastener, a second fastener, a third fastener, and a fourth fastener,
    wherein the first fastener passes through a first opening in the first inner corner extrusion securing the first inner corner extrusion to the first post, the second fastener passes through a second opening in the second inner corner extrusion securing the second inner corner extrusion to the third post, the third fastener passes through a third opening in the third inner corner extrusion securing the third inner corner extrusion to the second post, and the fourth fastener passes through a fourth opening in the fourth inner corner extrusion securing the fourth inner corner extrusion to the fourth post.

6. The portable structure of claim 1 wherein the first inner corner extrusion further comprises a first latch, the portable structure further comprising:
    a roof panel adapted to be secured to the first wall panel and the second wall panel using the first latch.

7. The portable structure of claim 1 wherein at least one of the first wall panel and the second wall panel comprises a window.

8. The portable structure of claim 1 further comprising:
a first fastener,
wherein the first fastener passes through a first opening in the first inner corner extrusion securing the first inner corner extrusion to the first post.

9. A two-piece extrusion assembly for securing a first wall panel and a second wall panel to a base comprising a post, the extrusion assembly comprising:
an outer corner extrusion comprising a first wall panel mount and a first post mount adapted to partially enclose the post; and,
an inner corner extrusion comprising a second wall panel mount and a second post mount adapted to fully enclose the post when used in combination with the outer corner extrusion.

10. The two-piece extrusion assembly of claim 9 wherein the outer corner extrusion comprises at least one of: a first side wall, a second side wall positioned opposite the first side wall, a first flange positioned substantially perpendicular to and extending from the first side wall, an alignment surface adapted to locate the inner corner extrusion relative to the outer corner extrusion, and a second flange positioned substantially perpendicular to and extending from the alignment surface.

11. The two-piece extrusion assembly of claim 10 wherein the first wall panel is aligned relative to the outer corner extrusion by at least one of: the first side wall, the second side wall, and the first flange.

12. The two-piece extrusion assembly of claim 10 wherein the second flange is adapted to locate the inner corner extrusion relative to the outer corner extrusion.

13. The two-piece extrusion assembly of claim 9 wherein the inner corner extrusion comprises at least one of: a first side wall, a second side wall positioned opposite the first side wall, an alignment surface adapted to locate the inner corner extrusion relative to the outer corner extrusion, and a flange positioned substantially perpendicular to the first side wall and extending from the second post mount.

14. The two-piece extrusion assembly of claim 13 wherein the second wall panel is aligned relative to the inner corner extrusion by at least one of: the first side wall, the second side wall, and the alignment surface.

15. The two-piece extrusion assembly of claim 9 wherein:
the outer corner extrusion comprises at least one of: a first side wall, a second side wall positioned opposite the first side wall, a first flange positioned substantially perpendicular to and extending from the first side wall, a first alignment surface adapted to locate the inner corner extrusion relative to the outer corner extrusion, and a second flange positioned substantially perpendicular to and extending from the alignment surface; and,
the inner corner extrusion comprises at least one of: a third side wall, a fourth side wall positioned opposite the second side wall, a second alignment surface adapted to locate the inner corner extrusion relative to the outer corner extrusion, and a third flange positioned substantially perpendicular to the third side wall and extending from the second post mount.

16. The two-piece extrusion assembly of claim 15 wherein the outer corner extrusion is aligned to the inner corner extrusion when the first alignment surface contacts the second alignment surface and the second flange contacts with third side wall.

17. A method of assembling a portable structure comprising a base comprising a first post and a second post, a first wall panel comprising a first outer corner extrusion and a second outer corner extrusion, the first outer corner extrusion adapted to partially enclose the first post and the second outer corner extrusion adapted to partially enclose the second post, and a second wall panel comprising a first inner corner extrusion adapted to fully enclose the first post when used in combination with the first outer corner extrusion, the method comprising:
positioning the first outer corner extrusion about the first post and the second outer corner extrusion about the second post;
positioning the first inner corner extrusion adjacent to the first outer corner extrusion;
securing the first inner corner extrusion to the first outer corner extrusion; and,
securing the first inner corner extrusion to the first post via a first fastener.

18. The method of assembling a portable structure of claim 17 wherein the base further comprises a third post and a fourth post, the second wall panel further comprises a second inner corner extrusion, and the portable structure further comprises a third wall panel comprising a third outer corner extrusion and a fourth outer corner extrusion, the third outer corner extrusion adapted to partially enclose the third post and the fourth outer corner extrusion adapted to partially enclose the fourth post, and a fourth wall panel comprising a third inner corner extrusion and a fourth inner corner extrusion, the third inner corner extrusion adapted to fully enclose the second post when used in combination with the second outer corner extrusion and the fourth inner corner extrusion adapted to fully enclose the fourth post when used in combination with the fourth outer corner extrusion, wherein the second inner corner extrusion is adapted to fully enclose the third post when used in combination with the third outer corner extrusion, the method further comprising:
prior to securing the first inner corner extrusion to the first outer corner extrusion, positioning the third outer corner extrusion about the third post and the fourth outer corner extrusion about the fourth post;
prior to securing the first inner corner extrusion to the first outer corner extrusion, positioning the second inner corner extrusion adjacent to the third outer corner extrusion;
after securing the first inner corner extrusion to the first outer corner extrusion, securing the second inner corner extrusion to the third outer corner extrusion;
securing the second inner corner extrusion to the third post via a second fastener;
positioning the third inner corner extrusion adjacent to the second outer corner extrusion;
positioning the fourth inner corner extrusion adjacent the fourth outer corner extrusion;
securing the third inner corner extrusion to the second outer corner extrusion;
securing the fourth inner corner extrusion to the fourth outer corner extrusion;
securing the third inner corner extrusion to the second post via a third fastener; and,
securing the fourth inner corner extrusion to the fourth post via a third fastener.

19. The method of assembling a portable structure of claim 18 wherein the first inner corner extrusion comprises a first latch, the second inner corner extrusion comprises a second latch, the third inner corner extrusion comprises a third latch, the fourth inner corner extrusion comprises a fourth latch, and the portable structure further comprises a roof panel, the method further comprising:

positioning the roof panel above the first, second, third and fourth wall panels;

securing the roof panel to the first, second, third and fourth wall panels via the first, second, third and fourth wall latches.

\* \* \* \* \*